United States Patent [19]

Shemenski et al.

[11] 4,452,291

[45] Jun. 5, 1984

[54] COATED FILAMENT AND COMPOSITE THEREOF WITH RUBBER

[75] Inventors: Robert M. Shemenski, North Canton; Thomas W. Starinshak, Berea, both of Ohio

[73] Assignee: The Goodyear Tire & Rubber Company, Akron, Ohio

[21] Appl. No.: 461,335

[22] Filed: Jan. 27, 1983

Related U.S. Application Data

[63] Continuation of Ser. No. 245,830, Mar. 20, 1981, abandoned.

[51] Int. Cl.³ .................. B60C 1/00; B29H 17/00; B05D 3/02; B32B 15/08
[52] U.S. Cl. .................................. 152/359; 156/124; 156/910; 427/384; 427/388.1; 428/381; 428/382; 428/389; 428/390; 428/461; 428/465

[58] Field of Search ............... 156/124, 910; 152/330 R, 356, 359; 427/384, 388.1; 428/381–382, 389–390, 461–463, 465

[56] References Cited

U.S. PATENT DOCUMENTS

| | | | |
|---|---|---|---|
| 3,846,160 | 11/1974 | Hirakawa et al. | 152/359 |
| 4,182,639 | 1/1980 | Pignocco et al. | 156/124 |
| 4,189,332 | 2/1980 | Rye et al. | 156/124 |

*Primary Examiner*—Lois E. Boland
*Attorney, Agent, or Firm*—Henry C. Young, Jr.

[57] ABSTRACT

A filament, and optionally a cord of cabled filaments, as a composite of (A) a filament and/or cord of steel, (B) a brass and/or zinc coating thereon and (C) a undercoat comprised of selected compounds. The invention further relates to a composite of such filament and/or cord as a reinforcement with rubber.

2 Claims, No Drawings

COATED FILAMENT AND COMPOSITE THEREOF WITH RUBBER

This is a continuation of application Ser. No. 245,830 filed Mar. 20, 1981, now abandoned.

FIELD OF THE INVENTION

This invention relates to treatment of a filament or cord of metallic-plated steel, such as predominantly a brass and/or zinc-coated steel wire, and to the resulting treated article. It further relates to a composite of rubber and such treated article as reinforcement therefor.

BACKGROUND OF THE INVENTION

Vehicle tires, particularly pneumatic or semi-pneumatic tires, are often reinforced by means of cords consisting of twisted or cabled brass and/or zinc-coated steel filaments. Such tire cord is often composed of a high carbon-steel filament having a very thin layer of brass, such as alpha brass, sometimes with the brass coating itself also having a thin zinc layer thereon, or a ternary alloy addition, such as cobalt or nickel. The cord may be monofilament although it is more normally prepared by cabling or stranding several filaments together. Generally, the steel filament is prepared by coating with brass, such as by electroplating, then cold drawn and stranded and/or cabled to form the cord.

Plated steel wire cords are generally subject to corrosion of the steel substrate and oxidation of the brass coating, particularly if improperly handled or stored prior to incorporation into a rubber composite which is ultimately shaped to a molded article such as a pneumatic tire. Corrosion and oxidation can also be caused from other external agents or elements in an environment where the cord is a reinforcement such as in a rubber composite. Such corrosion and oxidation can result in poor adhesion between the cords and rubber which, in turn, can result in a failure of the reinforcement in the rubber composite or can cause degradation of a good adhesive bond during service life of the composite.

Clean, untreated brass coated steel wire will normally have a reasonably good initial adhesion to the adjacent rubber. However, the adhesion typically will drop with time, particularly with aging due to heat, stress and/or chemical degradation or corrosion effects. Various additives described in the literature have in certain instances shown improved initial and aged adhesion. Yet such additives have often not proved entirely satisfactory either due to required complexities in their preparation or the mixed results realized from their use. Indeed, some types of aging would show improved adhesion and others apparently no improvement. It is therefore desirable that an agent, or agents, be found which protect(s) the bare metallic surface and does not adversely affect initial adhesion to any great degree, while at the same time, improving aged adhesion of a vulcanized composite. Further, it it particularly desired that such adhesion enhancing process be relatively simple and economical.

Various chemical reagents have been proposed and/or used to treat such coated wire for the purpose of protecting against corrosion and oxidation. For example, benzotriazole, tolyltriazole and naphthyltriazole, have been taught to be useful. Such reagents have sometimes been taught to be applied as a coating to the surface of a filament or cord by various methods, such as by immersing the wire in a water solution of the reagent, by treating the wire with the reagent in its molten form, or by exposing the wire to the reagent in its vapor phase.

Although the mechanism is not clearly understood, apparently such reagents physcially or chemically combine with the wire or wire coating to offer protection against oxidation and/or corrosion while often maintaining adhesion to a rubber substrate. Perhaps the reagent coating on the wire affects the sulfur/copper bond which might be formed between the wire and the adjacent rubber in a rubber composite which is reinforced with the wire.

It is important to appreciate, that reagents are continually being sought for the purpose of preventing or retarding oxidation and/or corrosion of the wire, particularly while the wire is in the form of reinforcement in a sulfur-cured rubber composite. In these regards, it is considered that it is not enough that reagents which are known or taught or thought to be corrosion inhibitors be arbitrarily chosen. This is because that such reagent, while it may be thought to be useful as a corrosion inhibitor, must also not degrade the adhesion between the cord and the rubber. Indeed, it is desired that such reagents actually enhance the cord to rubber bonding or adhesion.

For example, if it were only desired to prevent the corrosion of the wire, then it could be treated with the material such as vasoline, mineral oil or lacquer. However, it is surely readily recognized that such materials would be expected to seriously inhibit adhesion of the cord to rubber.

Therefore, it is desired to provide a treatment for steel filament or cord which has been previously metal or metal alloy plated such as with alloys containing predominantly brass and/or zinc, and to the resultant treated article. It is further desired to form a composite of rubber and such filament or cord as a reinforcement. It is also desired to provide articles containing such reinforcements such as pneumatic and semi-pneumatic tires, as well as industrial hose and industrial belts such as power transmission and conveyor belts.

DISCLOSURE AND PRACTICE OF THE INVENTION

In accordance with an aspect of this invention, a filament, optionally in the form of a multiple of filaments cabled together as a cord, is provided as a composite of (A) a filament and/or cord of steel, (B) a microscopically porous metallic coating thereon, comprised primarily of brass and/or zinc, and (C) an overcoat composed of (1) at least one compound selected from the grouping consisting of those of the following formulae:

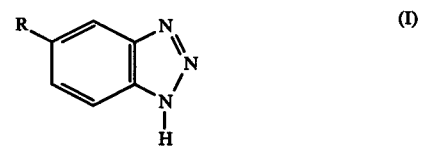

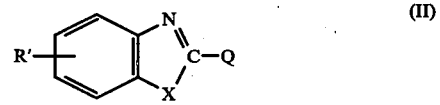

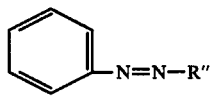

(III)

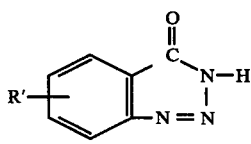

(IV)

(2) at least one diphenyl carbazide or 1,5-pentamethylene tetrazole, (3) a synergistic mixture comprised of 100 parts by weight benzotriazole and about 10 to about 150, preferably about 25 to about 100, parts by weight of a compound having the formula:

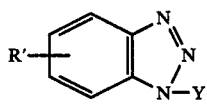

(V)

(4) a synergistic mixture of (i) 100 parts by weight benzotriazole or substituted benzotriazole of Formula (I) and, correspondingly, (ii) about 20 to about 75, preferably about 25 to about 50 parts by weight of at least one of dithiooxamide, 1,2,4-triazole, 2,1,3-benzothiadiazole and/or about 0.5 to about 10, preferably about 1 to about 8 parts by weight of at least one compound having the formula:

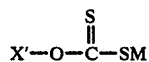

(VI)

where R is a radical selected from at least one of nitro-, and saturated alkyl radicals containing from 1 to 10, preferably 1 to 6 carbon atoms, where R' is selected from radicals of R and hydrogen, where R" is a radical selected from at least one of —NH—$C_6H_5$ and —C-S—NH—NH—$C_6$—$H_5$, radicals, where X is a radical selected from at least one of sulfur, oxygen and ammonium, where X' is a radical selected from at least one of saturated alkyl radicals containing 1 to 10, preferably 1 to 6 carbon atoms, alkyl substituted or unsubstituted phenyl, benzyl or cyclohexyl; where M is a radical selected from at least one of alkali metal radical, preferably sodium or potassium, a polyvalent metal selected from at least one of copper and zinc, or an alkali earth metal, preferably calcium, or hydrogen; where Y is a radical selected from at least one of hydrogen and hydroxyl radicals, and where Q is a radical selected from at least one of hydrogen or —SM radicals.

Preferably, the radicals of R, R' are selected from methyl, ethyl and nitro radicals. The alkyl substituted radical of X' is more preferably a hexyl radical. X is preferably selected from sulfur and oxygen radicals and M is preferably an alkali metal, particularly sodium or potassium.

Preferably Y is a hydroxyl radical and Q is a hydrogen radical.

In further accordance with this invention, a composite is provided composed of sulfur-cured rubber and containing therein, said treated filament or cord as reinforcement therefor.

In additional accordance with this invention, such a rubber reinforcement composite is provided in which a portion of the treatment agent or material is contained in the rubber.

In further accordance with this invention, a pneumatic rubber tire is provided having a generally toroidal shape and comprised of a tread, spaced inextensible beads and sidewalls connecting said beads and tread with a supporting carcass therefor, where said carcass is a composite of sulfur-cured rubber containing therein said treated filament or cord as reinforcement therefor.

In the practice of this invention, representative of various compounds of Formula (I) are 5-nitrobenzotriazole and 5-methylbenzotriazole.

Representative of the various compounds of Formula (II) are 2-mercaptobenzothiazole, 2-mercaptobenzothiazole sodium salt, 2-mercaptobenzooxazole, 2-mercapto-6-nitrobenzothiazole, 2-mercapto-6-methylbenzothiazole, benzoxazole and benzothiazole.

Representative of compounds (III) are diphenylthiacarbazone and 1,3-diphenyltriazene.

A representative compound of Formula (IV) is 1,2,3-benzothiazine-4(3H)one.

Representative compounds of Formula (V) are 1-hydroxybenzotriazole, 6-methylbenzotriazole and 5-nitrobenzotriazole.

Representative of the various compounds of Formula (VI) are potassium hexylxanthate, potassium ethylxanthate.

Preferred combinations are 1-hydrobenzotriazole with benzotriazole; potassium or sodium hexylxanthate with benzotriazole with or without a small amount of water vapor; 5-nitrobenzotriazole with benzotriazole; and benzotriazole with a small amount of water.

In the practice of this invention, the coating can be applied by various methods such as by aqueous dip, non-aqueous dip, aqueous/non-aqueous dip, vapor deposition, vapor deposition plus a solvent which can be aqueous or non-aqueous, step-wise addition, such as by first solution deposition and then vapor deposition.

The aqueous dip method can be accomplished by dissolving the coating material(s) in water and passing the wire filament or cord through it at about 30°–80° C. (liquid temperature) to provide the desired thickness of protective coating. The aqueous dip can be comprised of, for example, one part by weight of water and one to five parts by weight of the coating material(s).

The invention can be accomplished by a non-aqueous dip by passing the wire or filament through an alcohol solution comprised of, for example, 100 parts by weight methanol and/or isopropanol and about one to five parts by weight coating material(s).

The material can be applied by an aqueous/non-aqueous dip which can be composed of, for example, 50 parts by weight water, 30–70 parts by weight ethanol and/or isopropanol and one to five parts by weight coating material.

The material(s) can be deposited on the filament and/or cord by a vapor deposition by, for example, passing the wire filament or cord through a vapor of the coating material caused by heating the material above its boiling point. This can also include an additional, as a simultaneous or sequential, water vapor treatment.

The material can be applied in a molten form to the filament and/or cord by heating the material above its melting point and passing the wire filament or cord through it.

The material can be applied by a combination of vapor deposition and solvent deposition (aqueous and- /or non-aqueous) by the following method: Heat 4.7 grams of benzotriazole with 0.3 grams of potassium hexylxanthate in 100 milliliters of water in a container and heat to 100° C. using nitrogen as a vapor carrier gas.

The material can be applied by a step-wise addition, such as first by vapor and then by solution by the following technique:

Apply benzotriazole in the vapor state at about 160° C. then dip into 60° solution of 0.2 percent of potassium ethylxanthate.

Alternately, at least a part of the material may be mixed directly with the rubber and applied to the filament or cord or applied to both the rubber and cord, although it must be recognized that some materials will act better than others as adhesion aids, since some materials have been observed to clearly provide better adhesion of cord to rubber when applied directly to the cord.

The brass or zinc coating of a typical brass, zinc, or brass-zinc coated steel cord is microscopically porous, thereby exposing small areas of steel surface to any surrounding environment. It is believed that agents herein interact with copper in such a brass coating to form a polymeric complex of agent plus copper and/or zinc. This polymeric complex is insoluble in most solvents and serves as a protective barrier to any environmental degradation of the underlying brass.

It is not reasonably practical to describe within rigid limits the weights of polymeric complex to be formed or the amounts of agent to be applied much less the thickness of the respective barrier layers. Optimum thicknesses and amounts are a function of variables such as nature of the brass, zinc, or brass-zinc surface, viz., mode of deposition, thickness of initial oxide layers, magnitude of residual stresses, copper content, brass thickness, as well as the reactivity of the rubber-vulcanization system. However, as very general guidelines, but not in any sense limitations, the total barrier layers should nominally be in the range of about 10 to about 100 angstroms.

One should consider the fact that "over protection" of the cord with the treatment agents can possibly result in a cord, which, while resistant to corrosion, may not have desired adhesion pooperties. Therefore, care should be taken that excessively high levels of the agent or material in the rubber or on the cord not be used. For example, a relatively thick coating of a 50/50 mixture of benzotriazole and potassium hexylxanthate has been observed to give good oxidation protection to bare brass coated steel tire cord. However, although it was observed that initial adhesion to rubber was very good observed aged adhesion was very poor unless rubber compounding recipe changes were instituted to account for the higher agent levels on the cord.

Therefore, in view of such observations and the fact that compounds naturally vary in activity, statements herein relating to levels and amounts of treatment materials are to be considered as guidelines and not strict limitations in most cases.

The practice of the present invention has been observed to result in increased surface protection of brass-coated steel prior to rubber encapsulation and improved aged-adhesion, in many cases with improved initial, i.e., original adhesion of vulcanized brass-coated steel/rubber composites.

The rubber surrounding the metal can be any rubber, preferably diene rubbers such as natural rubber, rubbery copolymers of butadiene with styrene or acrylonitrile, polybutadiene and polyisoprene and can be compounded with conventional ingredients such as carbon black, zinc oxide, stearate or stearic acid, anti-degradant, sulfur, etc. However, as recited earlier, the effect of the agents used in this invention on vulcanization systems should be considered and the vulcanization system adjusted accordingly. The steel wire described in this invention relates generally to what is known as carbon steel, also called ordinary steel, also called straight carbon steel or plain carbon steel, e.g., American Iron and Steel Institute Grade 1070 high-carbon steel (AISI 1070). Such steel owes its properties chiefly to the presence of carbon without substantial amounts of other alloying elements. In this respect see Metals Handbook, The American Society for Metals, Metals Park, Cleveland, Ohio.

Brass relates to compositions in which the major component is alpha brass, i.e., which contains from about 62 to 75 percent copper and 38 to 25 percent zinc, respectively.

The practice of this invention is further illustrated by reference to the following example which is intended to be representative rather than restrictive of the scope of the invention. Unless otherwise indicated, all parts and percentages are by weight.

EXAMPLE 1

Rubber compounds, identified herein as compounds A and B, were prepared for the purpose of testing brass-coated steel wire which have been treated with the reagents used in this invention. The rubber compounds were mixed by conventional techniques according to the following recipe shown in Table 1.

TABLE 1

| Compound | Parts by Weight | |
|---|---|---|
| | A | B |
| Natural rubber | 100 | 100 |
| Stearic acid | 2 | 2 |
| Zinc oxide | 10 | 10 |
| Amine antioxidant | 1 | 1 |
| Sulfur | 3 | 5 |
| Sulfonamide-type accelerator | 1 | 1 |
| Cobalt Compound | 3 | 1 |
| Carbon black | 55 | 55 |

The treated cord samples according to this invention were evaluated by potentiostat, by hydrogen embrittlement testing and by a rubber adhesion test.

The potentiostat can be described as electrochemical technique that can yield comparative information on corrosion rates.

The hydrogen embrittlement test can be described as applying a DC (direct current) current to a sustained loaded wire in a one normal sulfuric acid solution and measuring the time to failure due to absorption of hydrogen.

The rubber adhesion test can be described by embedding wire between two layers of compounded rubber, curing the rubber, and then measuring the force required to pull out the wire from the rubber.

Static adhesion was measured in the standard manner (ASTM Designation D 2229-73 "Standard Method of Testing for Adhesion of Vulcanized Rubber to Steel Cord").

Adhesion tests were applied to composites of the treated cord and rubber, (1) after a 35-minute cure at 311° F., (2) after immersing the cured composite for 96 hours in salt water at 194° F., (3) after a 20-day aging uncured green block at 90 percent humidity at 98° F., and (4) after 6 hours steam aging at 248° F. of the cured composite.

TABLE 2

Hydrogen Embrittlement Test Applied

| Reagent | Rubber Component | Method of Application | Result of Test Applied[1] |
|---|---|---|---|
| No treatment (Control) | A | — | 55 sec |
| BTA[2] | A | aqueous dip | 72 sec |
| BTA + hexylxanthate | A | aqueous dip | 176 sec |

[1]In the hydrogen embrittlement test, the longer the time to failure, the better the effect of the treatment.
[2]Benzotriazole.

TABLE 3

Polarazation Test Applied

| Reagent for Treating wire | Rubber Component | Method of Application | Result of Test Applied[1] $\mu A/cm^2$ |
|---|---|---|---|
| No treatment | A | — | 83 |
| BTA | A | aqueous dip | 13 |
| BTA + diphenylthio-carbazone | A | non-aqueous dip | 6 |
| No treatment | A | — | 88 |
| BTA | A | vapor (solid) | 39 |
| BTA + ethylxanthate | A | vapor (aqueous soln) | 30 |
| 2-mercaptobenzo-thiazole | A | vapor (solid) | 19 |

[1]$\mu A/cm^2$ means micro amperes per square centimeter.

TABLE 4

Humidity Aging Test Applied[1]

| Reagent for Treating Wire | Rubber Component | Method of Application | Adhesion Retention % |
|---|---|---|---|
| No treatment (Control) | A | — | 57% |
| 5-nitrobenzotriazole | A | aqueous/non-aqueous dip | 61% |
| hydroxybenzotriazole | A | aqueous dip | 48% |
| BTA + hydroxybenzo-triazole | A | aqueous dip | 66% |
| 2-mercaptobenzo-xazole | A | aqueous/non-aqueous dip | 62% |

[1]Humidity aging is 20 days.

TABLE 5

Salt Water aging Water Test Applied[1]

| Reagent for Treating Wire | Rubber Component | Method of Application | Adhesion Retention % |
|---|---|---|---|
| No treatment (Control) | A | — | 66% |
| BTA | A | vapor (from aqueous soln) | 68% |
| BTA + hexylxanthate | A | vapor (from aqueous soln) | 92% |

[1]Emersion in Salt Water is 96 hours at 90° C.

TABLE 6

Humidity Aging Test Applied

| Reagent for Treating Wire | Rubber Component | Method of Application | Adhesion Retention % |
|---|---|---|---|
| No treatment (Control) | B | — | 71% |
| BTA | B | vapor (from aqueous soln) | 84% |
| BTA + hexylxanthate | B | vapor (from aqueous soln) | 90% |
| 2-mercaptobenzo-thiazole | B | vapor (from solid) | 58% |

TABLE 7

Salt Water Aging Test Applied[1]

| Reagent for Treating Wire | Rubber Component | Method of Application | Adhesion Retention % |
|---|---|---|---|
| No treatment (Control) | B | — | 58% |
| diphenylthio-carbazone | B | non-aqueous dip | 57% |

[1]Emersion in Salt Water is 96 hours at 90° C.

TABLE 8

Salt Water Aging Test Applied[1]

| Reagent for Treating Wire | Rubber Component | Method of Application | Adhesion Retention % |
|---|---|---|---|
| No treatment (Control) | A | — | 59% |
| BTA | A | aqueous dip | 62% |
| diphenylthio-carbazone | A | non-aqueous dip | 82% |
| BTA + dithio-oxamide | A | non-aqueous dip | 68% |

[1]Emersion in salt water is 96 hours at 90° C.

TABLE 9

Salt Water Aging Test Applied

| Reagent for Treating Wire | Rubber Component | Method of Application | Adhesion Retention % |
|---|---|---|---|
| No treatment (Control) | B | non-aqueous dip | 36% |
| BTA | B | non-aqueous dip | 41% |
| BTA + 1,2,4-tri-azole | B | non-aqueous dip | 67% |
| BTA + 1-hydroxy-benzotriazole | B | aqueous dip | 49% |

[1]Emersion in salt water is 96 hours at 90° C.

TABLE 10

Salt Water Aging Test Applied[1]

| Reagent for Treating Wire | Rubber Component | Method of Application | Adhesion Retention % |
|---|---|---|---|
| No treatment (Control) | B | — | 53% |
| diphenylcarbazide | B | non-aqueous dip | 68% |
| 1,5-pentamethylene-tetrazole | B | non-aqueous dip | 69% |

[1]Emersion in salt water is 96 hours at 90° C.

We claim:

1. A pneumatic rubber tire having a generally toroidal shape and comprised of a tread, spaced inextensible beads and sidewalls connecting said beads and tread with a supporting carcass therefor, where said carcass is a composite of sulfur-cured rubber containing therein a filament or cord thereof as reinforcement therefor, wherein said filament, optionally in the form of a multiple of filaments cabled together as a cord, is provided as a composite of (A) a filament and/or cord of steel, (B) a microscopically porous metallic coating thereon, comprised primarily of brass and/or zinc, and (C) an overcoat composed of (1) at least one compound selected from the group consisting of those of the following formula:

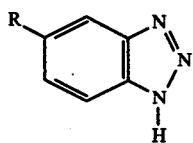 (I)

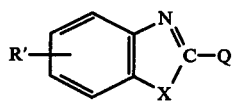 (II)

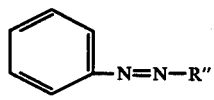 (III)

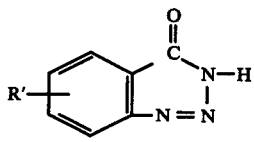 (IV)

(2) at least one diphenyl carbazide or 1,5-pentamethylene tetrazole, (3) a synergistic mixture comprised of 100 parts by weight benzotriazole and about 10 to about 150 parts by weight of a compound having the formula:

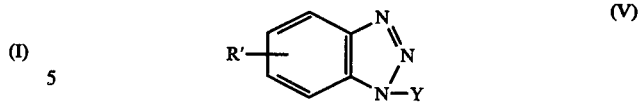 (V)

or (4) a synergistic mixture of (i) 100 parts by weight benzotriazole or substituted benzotriazole of Formula (I) and, correspondingly, (ii) about 20 to about 75 parts by weight of at least one of dithiooxamide, 1,2,4-triazole, 2,1,3-benzothiadiazole and/or about 0.5 to about 10 parts by weight of at least one compound having the formula:

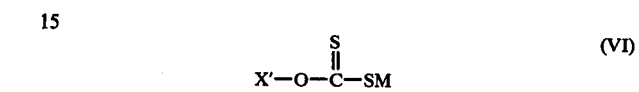 (VI)

where R is a nitro radical, where R' is a radical selected from at least one of nitro, hydrogen and saturated alkyl radicals containing from 2 to 10 carbon atoms, where R'' is a radical selected from at least one of —NH—$C_6H_5$ and —CS—NH—NH—$C_6H_5$, radicals, where X is a radical selected from at least one of oxygen and ammonium, where X' is a radical selected from at least one of saturated alkyl radicals containing 1 to 10 carbon atoms, alkyl substituted or unsubstituted phenyl, benzyl or cyclohexyl; where M is a radical selected from at least one of alkali metal radical, a polyvalent metal selected from at least one of copper and zinc, or an alkali earth metal; where Y is a hydroxyl radical and where Q is a radical selected from at least one of hydrogen or —SM radicals; provided that when Q is hydrogen, X is oxygen.

2. The pneumatic rubber tire of claim 1 where in said filament overcoat the alkyl radicals of R' and X' are selected from methyl, ethyl and hexyl radicals, X is an oxygen radical, M is selected from sodium or potassium, Y is a hydroxyl radical and Q is a hydrogen radical.

* * * * *